United States Patent [19]
Menzel

[11] 3,815,636
[45] June 11, 1974

[54] PRESSURE REDUCING VALVE AND FLOW CONTROL DEVICE

[75] Inventor: Stanley William Otto Menzel, Torrens Park, Australia

[73] Assignee: Iplex Plastic Industries Pty. Ltd., Elizabeth, Australia

[22] Filed: June 20, 1972

[21] Appl. No.: 264,634

[30] Foreign Application Priority Data
June 23, 1971 Australia.............................. 5288/71
Feb. 28, 1972 Australia.............................. 8096/72

[52] U.S. Cl. ................................................ 138/43
[51] Int. Cl. .............................................. F16d 1/00
[58] Field of Search ................... 138/43, 45, 46, 41

[56] References Cited
UNITED STATES PATENTS

| | | | |
|---|---|---|---|
| 2,289,905 | 7/1942 | Dasher | 138/43 X |
| 2,506,152 | 5/1950 | Hunter | 138/43 X |
| 2,781,060 | 2/1957 | Frey | 138/46 |
| 2,802,486 | 8/1957 | Frey | 138/46 |
| 2,850,038 | 9/1958 | Shabaker | 138/43 X |
| 3,082,789 | 3/1963 | Welty et al. | 138/43 X |
| 3,474,831 | 10/1969 | Noakes | 138/43 |
| 3,697,002 | 10/1972 | Parkison | 138/46 X |

*Primary Examiner*—Charles A. Ruehl
*Attorney, Agent, or Firm*—Wofford, Felsman & Fails

[57] ABSTRACT

A flow control device for fluids in which an elastomeric member in contact with a body, has an elongated channel formed between body and elastomeric member with at least one wall of the channel formed by the elastomeric member, fluid being admitted to the channel at one end and allowed to flow from the other end, but the channel is so arranged that fluid fed to the channel exerts pressure on the elastomeric member to press the member to the body whereby to deform the elastomeric member to vary the cross-sectional area of the said channel in accordance with the applied pressure.

2 Claims, 7 Drawing Figures

3,815,636

PRESSURE REDUCING VALVE AND FLOW CONTROL DEVICE

BACKGROUND OF INVENTION

This invention relates to a pressure reducing valve and flow control device.

Pressure reducing valves are already known which can be placed into fluid lines to control the pressure so as to avoid excessive pressure rises in devices controlled by the reducing valve.

These are usually of intricate form and comprise balanced pistons and the like whereby the pressure applied on one side is regulated to be of a lower value than at the other side, the input pressure thus being able to vary considerably but the output pressure being maintained substantially uniform in spite of input fluctuations. It is also known to use resilient rings in a flared aperture to reduce flow by forcing the ring further into the aperture with increased pressure to reduce the internal diameter of the ring.

One of the problems in drip feed irrigation is to control the pressure in a line fitted with drip feeders, because obviously as the pressure of the line varies, so the amount of feed from the drip feeders also varies, a condition which is not desirable.

It would therefore be advantageous if a form of control could be provided to limit the pressure at least within certain limits to avoid large fluctuations in the drip feed supply line or in the drip feeder itself.

While the foregoing is one of the applications of the present invention, its principle however is such that it will have many other uses and its use therefore is not in anyway to be limited to the control of pressures in irrigation.

SUMMARY OF INVENTION

The objects of the present invention are to provide a simple and highly effective form of pressure control which can be placed into a pressure line or drip feed device to regulate the output pressure so that it is maintained substantially uniform irrespective of changes in input pressure and thus, when applied to a drip feed device, will give a regulated supply.

This is achieved according to this invention by utilizing an elastomeric member which is disposed within a body having an elongated open channel so that the area of the channel is decreased when the pressure increases. Thus the flow to the output of the device takes place through a channel one wall at least of which is formed by the elastomeric member, in which the elastomeric member if acted on by the pressure fluid and is distorted in proportion to the pressure to control the flow through the channel.

Obviously while an elastomeric member in a channelled body is one form, it would also be possible to form the elastomeric member with channels and to dispose it in a body because pressure on the elastomeric member could again vary the dimensions of the flow channel.

One of the advantages of such a device is that if there is any blockage of the channel, it is only necessary to lower the pressure supply to the device whereupon the elastomeric member can return to maximum flow which usually allows such obstruction to pass through.

Obviously, the construction of such a device can be greatly varied, but to enable the invention to be fully appreciated, some embodiments will now be described.

BRIEF DESCRIPTION OF DRAWINGS

FIG. 6 shows the filter and support for elastomeric member, FIG. 5 is a perspective view of a drip feed device, showing its relationship to a supply hose and a distributor which may be used where such a device feeds a series of trees, FIG. 6 is a cross-section of a modified form of drip feed device.

DESCRIPTION OF PREFERRED EMBODIMENTS

Figure 1:
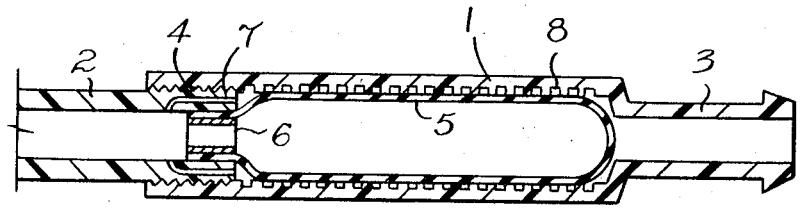
FIG. 1 is a longitudinal section of a simple form of the invention used as a means of regulating water flow.

According to the embodiment of the invention shown in FIG. 1, a tubular body is adapted to be connected into a line through which there is a flow of water or other fluid so that water or other fluid enters at the inlet end 2 and leaves at the outlet end 3. The inlet end is held to the body 1 by a thread 4 and has secured to it one end of a bag 5 which is locked to the inlet end 2 by a ferrule 6. Water flows into the bag through the ferrule 6 and also is admitted to the space between the bag 5 and the body 1 by ducts 7. The ducts 7 can be restrictive to ensure that pressure within the bag 5 exceeds outside pressure to ensure that the bag is forced against the inner wall of the tubular body 1.

If, therefore, pressure fluid is allowed to flow into such a bag, which is formed of an elastomeric material such as rubber or rubber-like plastic, it will be distended to seat tightly against the inside of an unchannelled body, fluid flow to the end 3 would be cut off, but to utilize the principle of an elastomeric bag, the body 1 has a helical channel formed in its inner surface to provide a path of flow for the fluid between the resilient bag 5 and the body 1.

When such a device is used for the supply of drip feed irrigation systems it will be realized that as water pressure rises, the pressure of the bag 5 against the channelled body 1 is increased, and by flexing of the bag 5 the channel can be partly closed off by distorting the bag partly into the open channel to allow a lesser flow than would otherwise be possible. With a decrease in mains pressure, the pressure within the bag lessens and the force of the bag against the channeled body decreases to allow a greater flow of water through the channel 8 because the elastomeric pad will return to its original shape.

As stated earlier it is essential that the pressure be differentially adjusted so that the pressure within the bag is always greater than the pressure outside of the bag, which can be achieved by the metering ducts 7.

Figure 2:
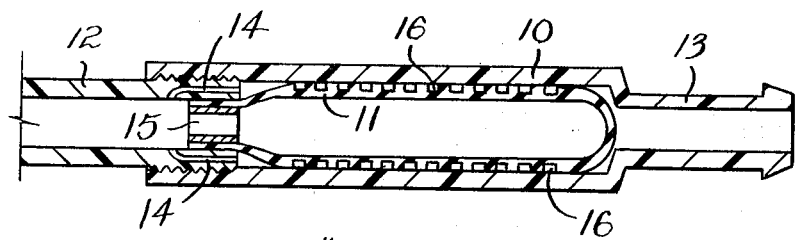
FIG. 2 is a similar view of another embodiment.

In the device shown in FIG. 2 the same assembly is used comprising a body 10, elastomeric bag 11, inlet end 12, outlet end 13, differential pressure control ducts 14, and locking ferrule 15, but the helical channel 16 is formed in the bag 11.

In each case at least one wall of the channel can be pressed in by water pressure within the bag to restrict the channel.

It is preferred to taper the inner wall of the body 18 to decrease in size from its open end to its closed end and to similarly taper the sleeve 22 to ensure good contact as the sleeve is pushed onto the body, and moulding is also facilitated.

Figure 3:
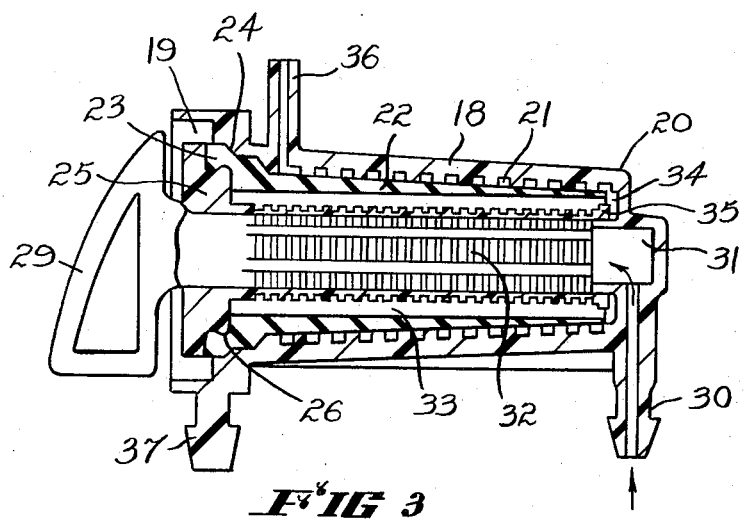
FIG. 3 is a central longitudinal view of the invention applied to a drip feed device.
Figure 4:
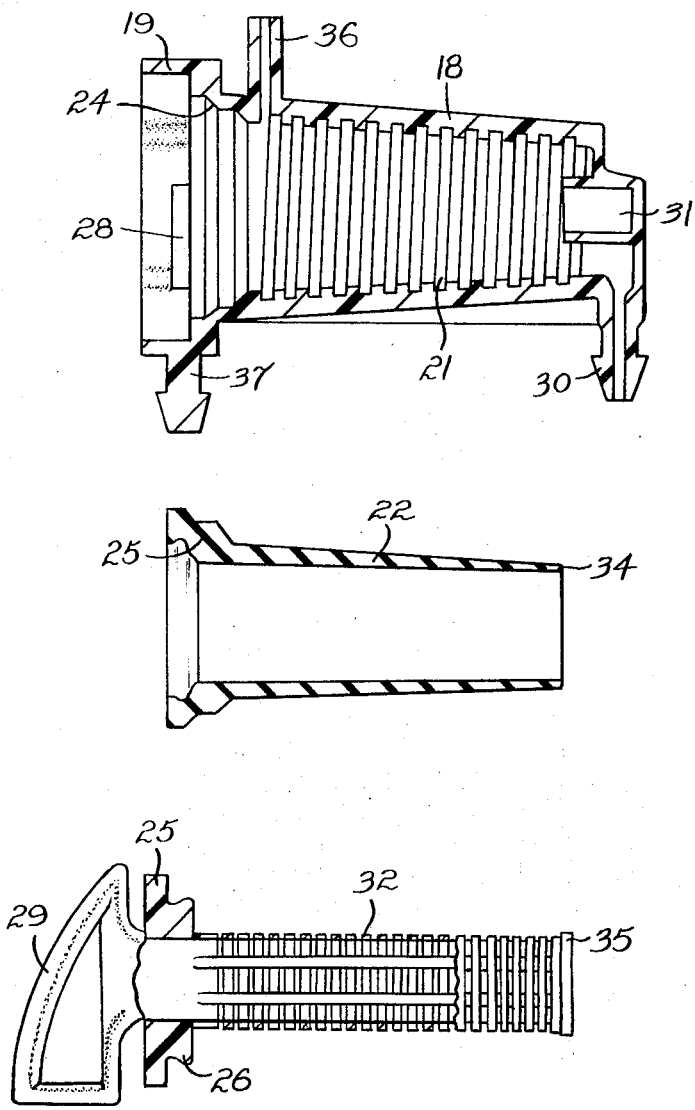
FIGS. 4, 5 and 6 show the components which make up the device of FIG. 3, FIG. 4 showing the body, FIG. 5 showing the elastomeric member
Figure 5:
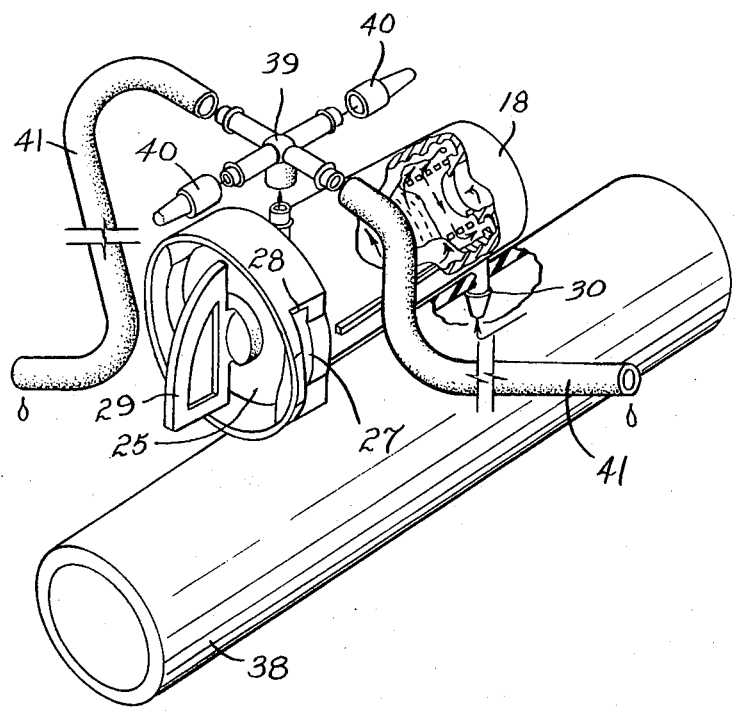

In the form shown in FIGS. 3 to 5, which includes a practical form of drip feed device embodying the invention, a hollow body 18 is tapered from an open end 19 to a closed end 20 and has a helical channel 21 formed in its inner wall which forms the resistance medium to break down the water pressure due to friction in the relatively long channel.

Fitting into this hollow body 18 is an elastomeric sleeve 22 formed of plastic or rubber or the like which has both ends open but which has its outer surface conforming substantially to the inner surface of the hollow body 18, this member being adapted to be inserted in the hollow body 18 with the outer wall of the sleeve 22 forming the one wall of the helical channel 21, the sleeve having at its one end an expanded portion 23 which acts as a seal against a seating 24 in the hollow body 18 so that one end of this sleeve 22 is sealed to the open end 19 of the hollow body when a plug 25 is inserted into the end of the body 18 and locked, the plug 25 having a cross-section such that a ridge 26 is formed which engages the end portion of the sleeve as shown in FIG. 3. A projection 27 of the plug 25 engages a groove 28 in the end 19 of the body 18 when the plug and sleeve 22 are inserted and turned by means of the flange or key 29.

The outer end of the resilient sleeve 22 is open, and communicates with the water inlet 30 to the hollow body 18 so that water can enter the chamber 31 in the body 18 and then flows through the strainer 32 into the hollow 33 in the body 18.

From the hollow 33 the water flows past the end 34 of the resilient sleeve into the helical channel 21 in the body and through this channel to discharge at the outlet 36 forming part of the body 18.

The strainer 32 ensure that coarser particles will not enter the channel 21. It will be noted that the plug 25 which holds the sleeve 22 in position has the strainer 32 on it, the end 35 of the strainer 32 fitting over the wall of the chamber 31.

As the water enters the hollow 33 it exerts pressure on the inside of the sleeve 22 and presses sleeve 22 against the open face of the helical channel 21 and thus controls the cross-section of the channel by distorting the elastomeric sleeve 22 partway into the opening of the channel 21.

It will be noted that because the elastomeric sleeve is sealed at one end and open at the other, it again forms a bag in a similar manner to the embodiments of FIGS. 1 and 2.

The lock member 37 acts to engage one aperture in a hose 38 into another aperture of which the inlet 30 is engaged so that the drip feed device is held parallel to the hose 38 as illustrated, particularly in FIG. 5.

In this figure the outlet 36 is shown with a manifold 39 which can supply outlet 40 or small hoses 41 which can lead to remote discharge points.

Figure 6:
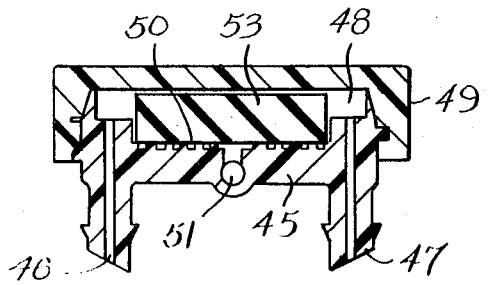
Figure 7:
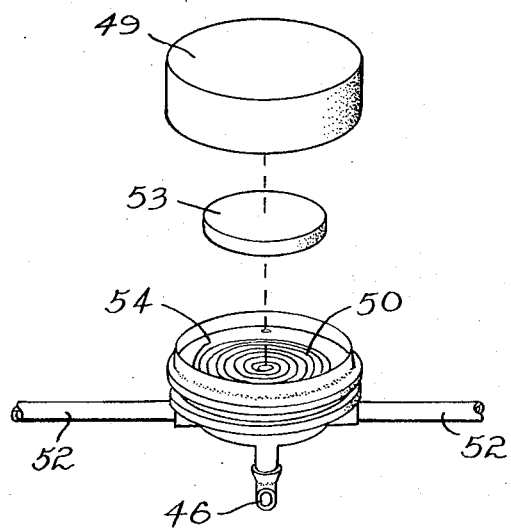
FIG. 7 is an exploded view of the device shown in FIG. 6.

In the embodiment shown in FIGS. 6 and 7 the body 45 has a pair of inlets 46 and 47 which communicate with a hollow 48 in the body 45. A cap 49 fits over the hollow body 45 and seals it.

In the body 45 is a spiral channel 50 which opens at the centre to an outlet 51 which communicates with a pair of delivery tubes 52 which lead to the areas to be drip fed.

The spiral channel 50 is open upwardly but has an elastomeric pad 53 fitted over the channel 50 to form one of the channel walls.

Water from the hollow 48 presses on the pad 53 and restricts the channel 50 proportionally, the water entering the channel 50 at the outer starting point 54 which is disposed outside of the area covered by the pad 53.

From the foregoing embodiments it will be realized that a wide range of embodiments can be designed within the spirit of the invention.

The channel can take a form other than helical or spiral, provided it is elongated sufficiently to break down pressure of fluid flowing through it to a sufficient amount.

I claim:
1. A flow control device for fluids, comprising:
    a. a hollow body having an open end and a closed end and a frusto-conical inner wall that tapers from a larger diameter at the open end to a smaller diameter at the closed end;
    b. a fluid inlet adjacent the closed end and a fluid outlet adjacent the open end of said body;
    c. an open ended elastomeric sleeve disposed within said body and conformingly engaging said inner wall;
    d. an open elongated helical channel interposed between said sleeve and said inner wall and formed in either said body or said sleeve;
    e. a removable plug engaging the open end of said body, said elastomeric sleeve being confined at its one end between said plug and said body to seal said body and sleeve at that end, whereby fluid enters the body adjacent said closed end and flows into said sleeve and also into said channel and along said channel to said outlet while under control of fluid pressure exerted within said sleeve.
2. A flow control device according to claim 1 characterized by a hollow strainer extending from said plug into the hollow of said body and engaging the said fluid inlet at the closed end of the said body.

* * * * *